(12) United States Patent
Arnold et al.

(10) Patent No.: US 9,807,980 B2
(45) Date of Patent: Nov. 7, 2017

(54) PET LEASH

(71) Applicant: (we) dog, LLC, Cumming, GA (US)

(72) Inventors: Jennifer Joan Arnold, Milton, GA (US); Shannon Jean Arnold, Cumming, GA (US)

(73) Assignee: (WE) FOR DOGS, LLC, Cumming, GA (US)

( * ) Notice: Subject to any disclaimer, the term of this patent is extended or adjusted under 35 U.S.C. 154(b) by 229 days.

(21) Appl. No.: 14/656,792

(22) Filed: Mar. 13, 2015

(65) Prior Publication Data

US 2016/0262353 A1    Sep. 15, 2016

(51) Int. Cl.
*A01K 27/00* (2006.01)
*A01K 29/00* (2006.01)

(52) U.S. Cl.
CPC .......... *A01K 27/003* (2013.01); *A01K 27/005* (2013.01); *A01K 29/00* (2013.01)

(58) Field of Classification Search
CPC .. A01K 27/003; A01K 27/006; A01K 27/008; A01K 27/00; A01K 15/025; A01K 15/027
See application file for complete search history.

(56) References Cited

U.S. PATENT DOCUMENTS

| | | | |
|---|---|---|---|
| 1,699,308 A * | 1/1929 | Postings | A01K 15/027 119/704 |
| 3,441,005 A | 4/1969 | Fink | |
| D244,869 S | 6/1977 | Manley | |
| 4,879,972 A | 11/1989 | Crowe | |
| 5,038,717 A * | 8/1991 | Bent | A01K 15/02 119/815 |
| 5,415,132 A * | 5/1995 | Meyer | A01K 15/025 119/707 |
| 5,474,033 A * | 12/1995 | Mitchell, Jr. | A01K 27/006 119/709 |
| 5,632,234 A * | 5/1997 | Parker | A01K 27/003 119/795 |
| 5,697,660 A * | 12/1997 | Smetz | B65G 7/12 294/137 |
| 5,701,848 A | 12/1997 | Tozawa | |
| 5,746,158 A * | 5/1998 | Landherr | A01K 27/006 119/858 |
| D425,265 S * | 5/2000 | Rubinstein | D30/153 |

(Continued)

FOREIGN PATENT DOCUMENTS

| CA | 163964 | 4/2016 |
|---|---|---|
| WO | 2016148727 | 9/2016 |

OTHER PUBLICATIONS

"13 Stylish Collars and Leashes for Your Pup: #7". Found online Oct. 5, 2016 at brit.co. Page dated Aug. 24, 2013. Retrieved from http://www.brit.co/collars-leashes/., 13 pgs.

(Continued)

*Primary Examiner* — Kristen C Hayes
(74) *Attorney, Agent, or Firm* — Taylor English Duma LLP

(57) ABSTRACT

A leash comprises a main strap; a pet attachment arm connected to the main strap, the pet attachment arm including an animal connection mechanism; and a pet accessory arm connected to the main strap, the pet accessory arm including an accessory connection mechanism. A method of using a leash includes holding the leash and connecting the leash to a pet.

15 Claims, 7 Drawing Sheets

(56) References Cited

U.S. PATENT DOCUMENTS

| | | | | |
|---|---|---|---|---|
| 6,237,539 B1* | 5/2001 | Sporn | A01K 27/003 | 119/771 |
| 6,273,029 B1* | 8/2001 | Gish | A01K 27/003 | 119/792 |
| 6,626,132 B1* | 9/2003 | Mann | A01K 27/003 | 119/769 |
| 6,932,027 B1* | 8/2005 | Whitney | A01K 27/00 | 119/770 |
| 6,990,929 B2 | 1/2006 | Young, III | | |
| 7,096,827 B2* | 8/2006 | Sporn | A01K 27/005 | 119/792 |
| 7,467,604 B1* | 12/2008 | Werner | A01K 27/00 | 119/770 |
| 7,757,639 B1* | 7/2010 | Prendes | A01K 27/003 | 119/772 |
| 8,151,737 B1 | 4/2012 | Alonzo | | |
| 8,448,608 B2 | 5/2013 | Mucerino | | |
| D685,143 S | 6/2013 | Hess | | |
| 9,010,279 B1* | 4/2015 | Saber | A01K 27/003 | 119/702 |
| 9,392,769 B2* | 7/2016 | Van Bemmelen | A01K 27/003 | |
| D782,131 S | 3/2017 | Arnold | | |
| 2004/0200433 A1 | 10/2004 | Oblack | | |
| 2006/0032461 A1* | 2/2006 | Sporn | A01K 27/005 | 119/797 |
| 2006/0150923 A1* | 7/2006 | Jones | A01K 27/003 | 119/795 |
| 2007/0012262 A1 | 1/2007 | Cole | | |
| 2007/0157892 A1* | 7/2007 | Farrell | A01K 27/004 | 119/795 |
| 2010/0024741 A1* | 2/2010 | Schoppman | A01K 27/005 | 119/795 |
| 2010/0050956 A1* | 3/2010 | Pellei | A47D 13/086 | 119/770 |
| 2011/0011352 A1* | 1/2011 | Lee | A01K 27/004 | 119/797 |
| 2012/0103277 A1* | 5/2012 | Klein | A01K 27/003 | 119/770 |
| 2013/0167782 A1* | 7/2013 | Poch | A01K 27/003 | 119/795 |
| 2014/0076244 A1 | 3/2014 | Byrne | | |

OTHER PUBLICATIONS

"2 Dog Walker Tangle-Free Adjustable Nylon Leash". Found on line Oct. 5, 2016 at amazon.com. Page dated Jan. 22, 2015. Retrieved from https://www.amazon.com/ . . . , 3 pgs.

Side Kick Hands Free Dog Leash. Found on line Oct. 5, 2016 at irondoggy.com. Page dated Nov. 1, 2015. Retrieved from https://irondoggy.com/products/sidekick-hands-free-leash., 4 pgs.

"Zack & Zoey Nylon 2-Way Dog Coupler". Found online Oct. 5, 2016 at amazon.com. Page dated Jul. 3, 2007. Retrieved from https ://www.amazon.com/Zack-Zoey-Nylon-Coupler-12-1 nch/dp/B000J4GC00/ref =Cm_cr _arp _d_product_top ?ie=UTF8., 2 pgs.

Arnold, Jennifer Joan; Notice of Allowance for U.S. Appl. No. 29/519,379, filed Mar. 4, 2015, dated Nov. 2, 2016; 20 pgs.

Arnold, Jennifer Joan; Office Action for Canadian serial No. 163964, dated Aug. 19, 2015, dated Dec. 7, 2015, 2 pgs.

Arnold, Jennifer Joan; Issue Notification for U.S. Appl. No. 29/519,379, filed Mar. 4, 2015, dated Mar. 1, 2017; 1 page.

Arnold, Jennifer Joan; International Search Report and Written Opinion for PCT Application No. PCT/US15/22765, filed Mar. 26, 2015, dated Jul. 23, 2015, 9 pgs.

Arnold, Jennifer Joan; PCT Application entitled: Pet Leash having serial No. PCT/US15/22765, filed Mar. 26, 2015, 23 pgs.

Arnold, Jennifer Joan; U.S. Design Application entitled: Pet Leash having U.S. Appl. No. 29/519,379, filed Mar. 4, 2015, 5 pgs.

* cited by examiner

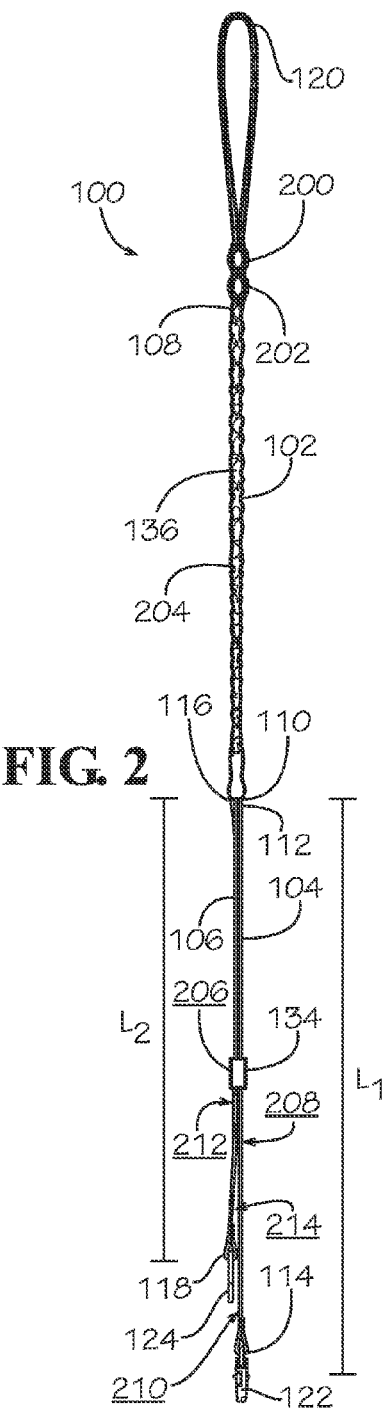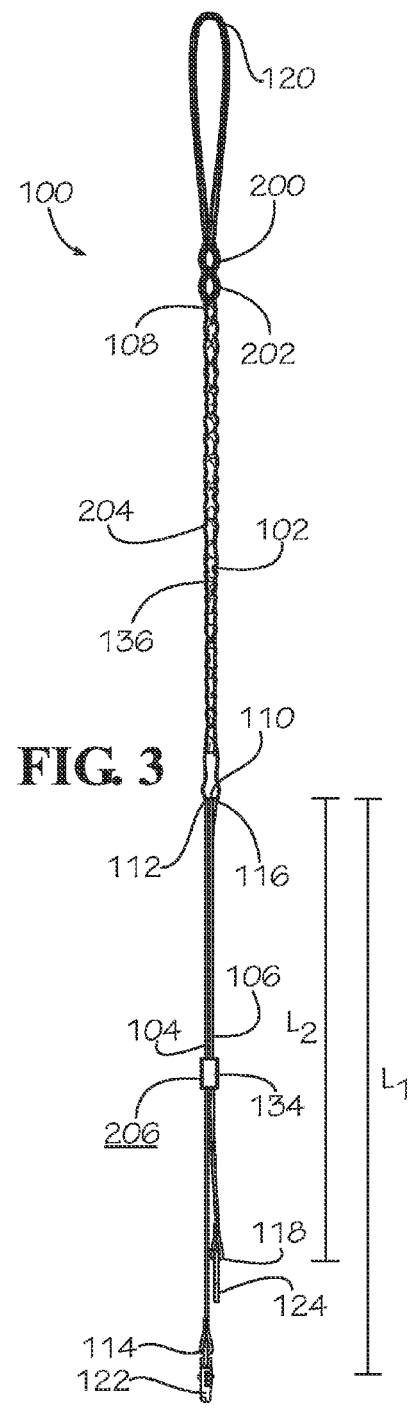

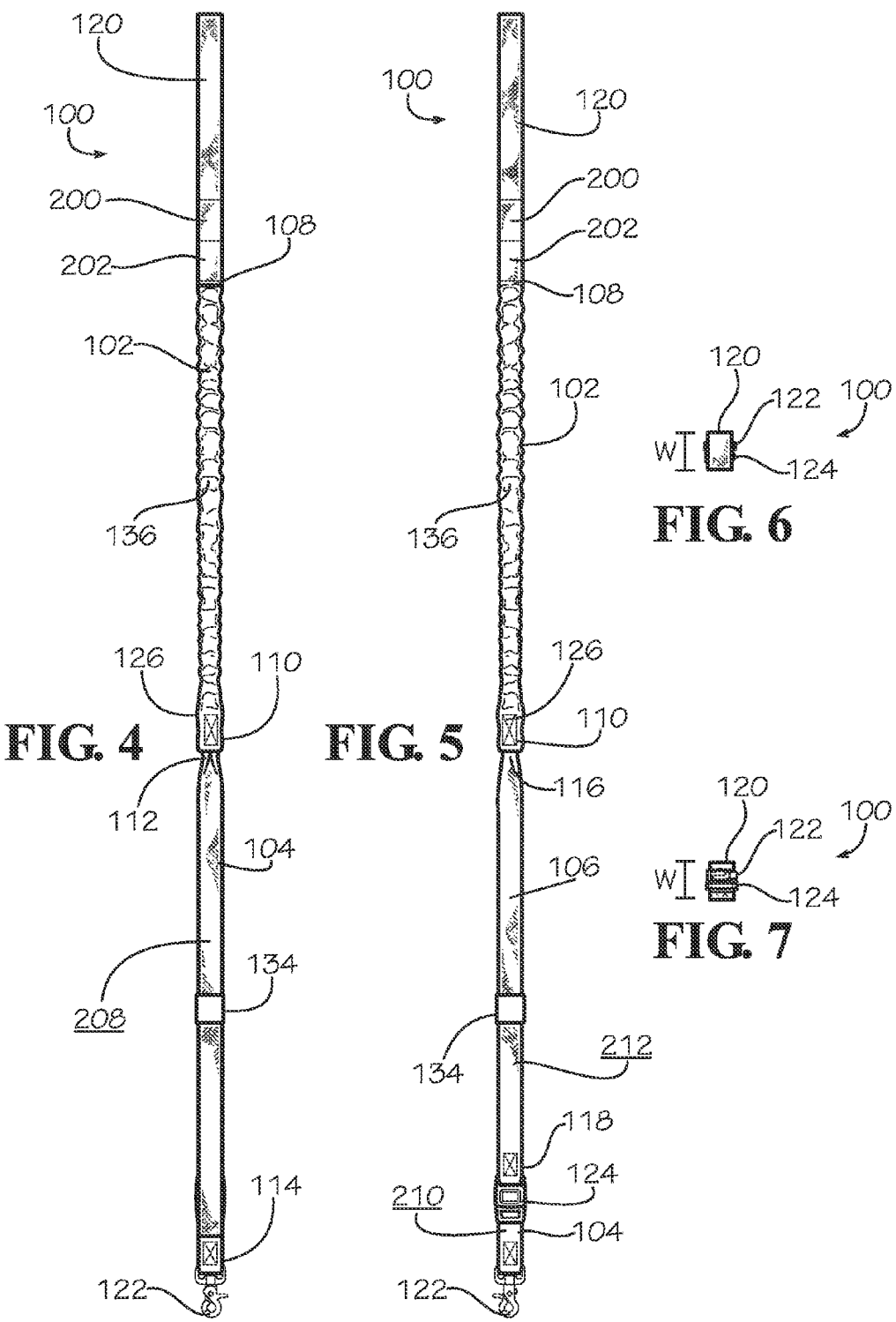

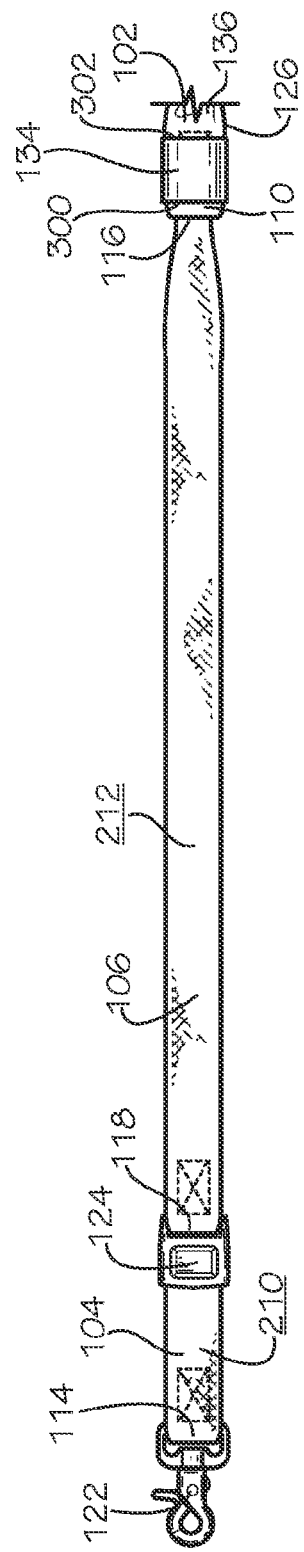
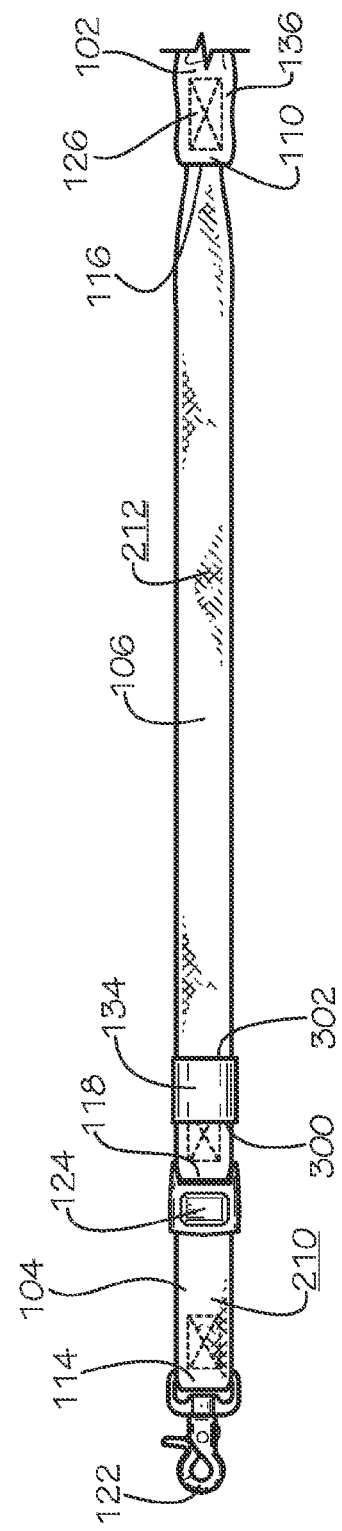
FIG. 8
FIG. 9

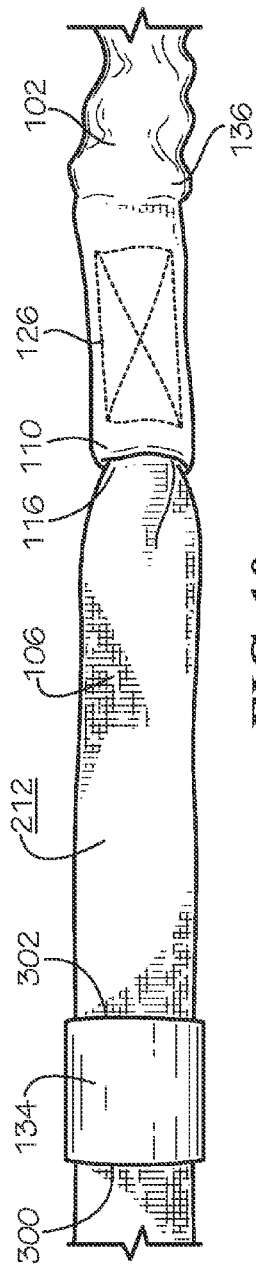
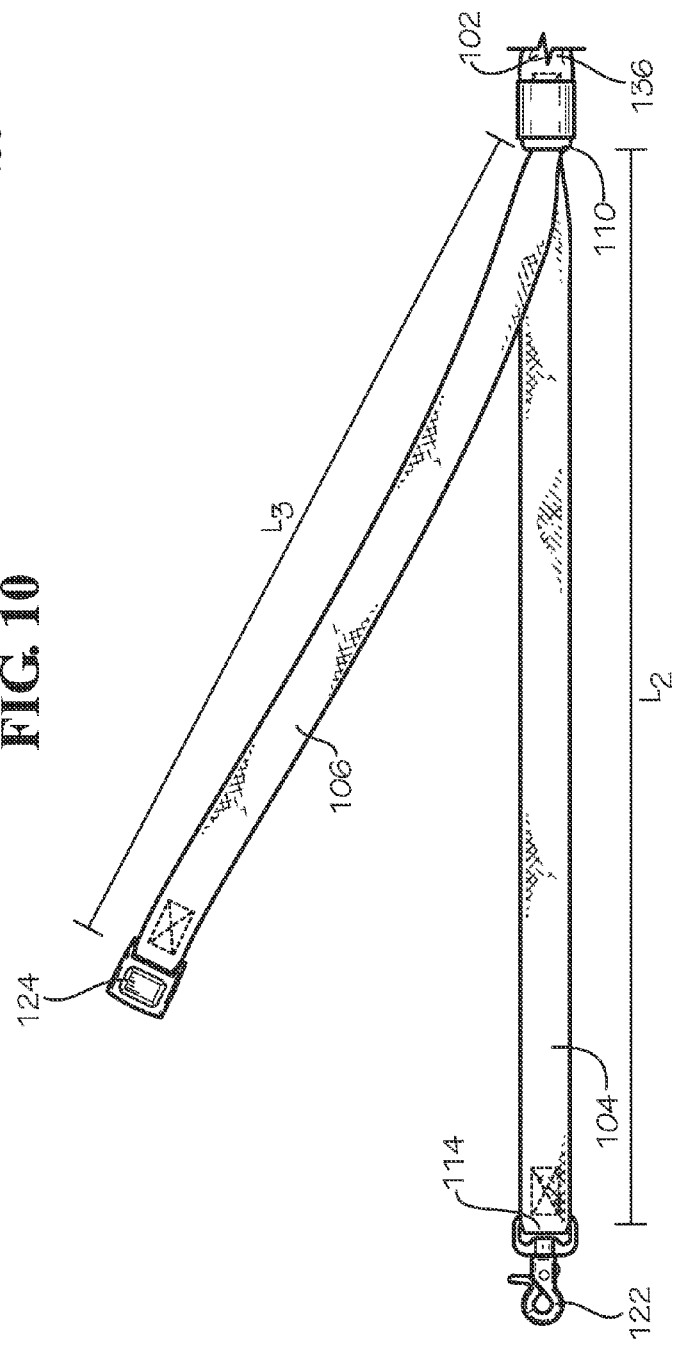

PET LEASH

TECHNICAL FIELD

This disclosure relates to leashes. More specifically, this disclosure relates to pet leashes with an accessory attachment.

BACKGROUND

Leashes are commonly used by animal owners to restrain their animals, such as dogs, while walking them to prevent the animal from straying away from the owner. While on walks, untrained pets tend to try to walk ahead of the owner and pull on the leash rather than walk beside or otherwise near the owner. Pets that excessively pull on the leash can injure or strain themselves, especially if the leash is attached to a collar around the pet's neck, or escape the owner.

SUMMARY

Disclosed is a leash comprising: a main strap; a pet attachment arm connected to the main strap, the pet attachment arm including an animal connection mechanism; and a pet accessory arm connected to the main strap, the pet accessory arm including an accessory connection mechanism.

Also disclosed is a method of using a leash, the method comprising: holding a leash, the leash comprising a main strap, a pet attachment arm connected to the main strap, the pet attachment arm including an animal connection mechanism, and a pet accessory arm connected to the main strap, the pet accessory arm the pet accessory arm including an accessory connection mechanism; and connecting the pet attachment arm to a pet.

Also disclose is a connectable accessory for a leash comprising: a pet accessory; and a leash connection mechanism attached to the pet accessory.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 2 is a front view of the leash of FIG. 1.
FIG. 3 is a back view of the leash of FIG. 1.
FIG. 4 is a side view of the leash of FIG. 1.
FIG. 5 is another side view of the leash of FIG. 1.
FIG. 6 is a top view of the leash of FIG. 1.
FIG. 7 is a bottom view of the leash of FIG. 1.

FIG. 8 is a partial side view of the main strap, pet attachment arm, pet accessory arm, and slider of FIG. 1 with the slider in an unrestricting position.

FIG. 9 is another partial side view of the main strap, pet attachment arm, pet accessory arm, and slider of FIG. 1 with the slider in a restricting position.

FIG. 10 is another partial side view of the main strap, pet attachment arm, pet accessory arm, and slider of FIG. 1 with the slider at an intermediary position between the unrestricting position and restricting position.

FIG. 11 is another partial side view of the main strap, pet attachment arm, pet accessory arm, and slider of FIG. 1.

DETAILED DESCRIPTION

Disclosed is a leash and associated methods, systems, devices, and various apparatus. The leash includes a main strap, a pet attachment arm, and a pet accessory arm. It would be understood by one of skill in the art that the disclosed leash is described in but a few exemplary embodiments among many. No particular terminology or description should be considered limiting on the disclosure or the scope of any claims issuing therefrom.

Figure 1:
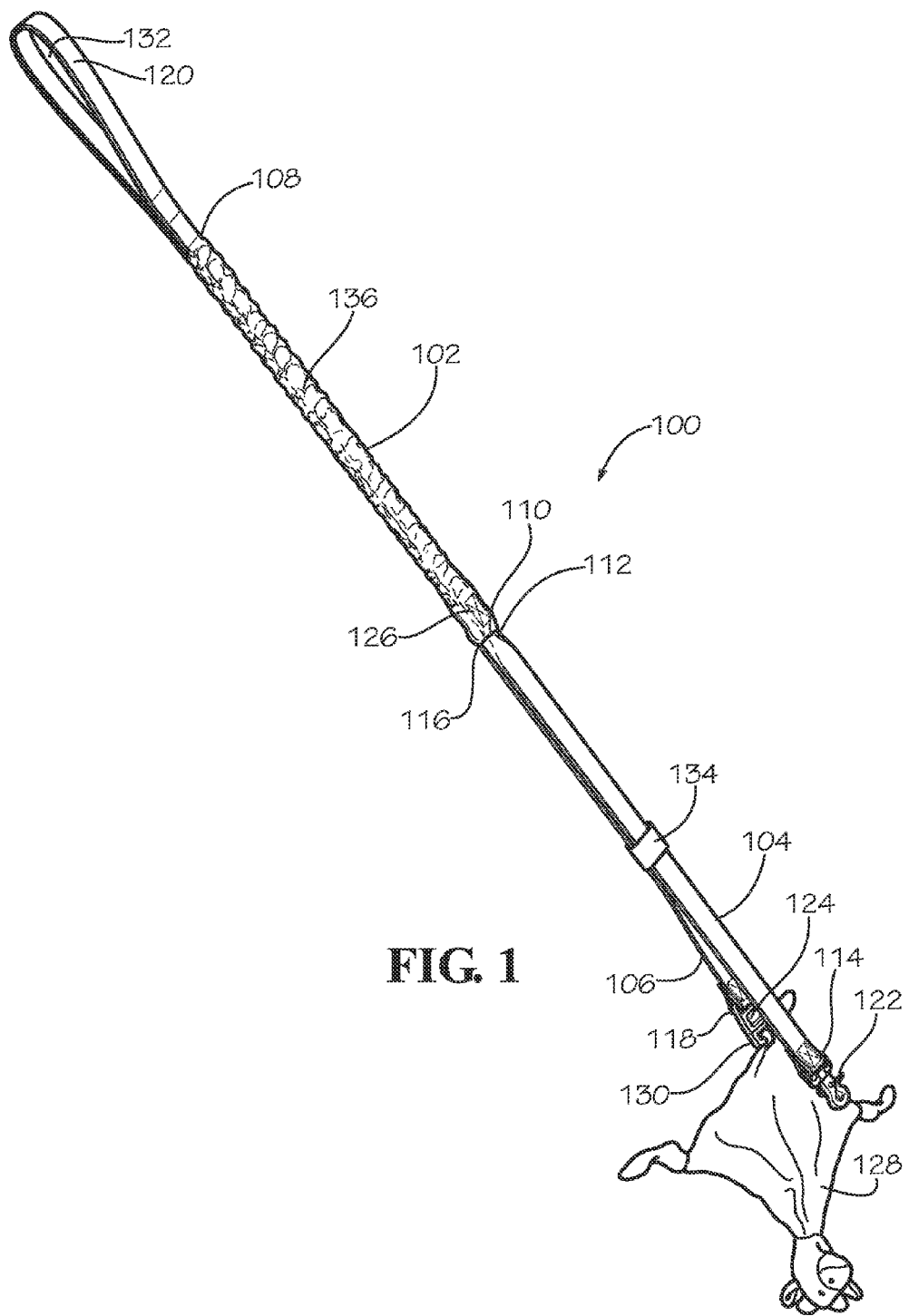
FIG. 1 is a perspective view of a leash having a main strap, a pet attachment arm, a pet accessory arm, and a slider according to an embodiment of the current disclosure, with a pet accessory attached.

One embodiment of a leash 100 is disclosed and described in FIG. 1. The leash 100 includes a main strap 102, a pet attachment arm 104, and a pet accessory arm 106. In various embodiments, the main strap 102 has a first end 108 and a second end 110, the pet attachment arm 104 has a first end 112 and a second end 114, and the pet accessory arm 106 has a first end 116 and a second end 118. When the leash 100 is used by a user, the user may hold the main strap 102, the pet attachment arm 104 is connected to an animal restraint such as a collar or harness, and the pet accessory arm 106 is connected to a connectable accessory. As shown in FIG. 1 and described in greater detail below, in various embodiments the leash 100 includes a slider 134 slidable on the main strap 102, the pet attachment arm 104, and the pet accessory arm 106.

In various embodiments, each of the main strap 102, the pet attachment arm 104, and the pet accessory arm 106 may be constructed to form a sleeve. In various embodiments, each of the main strap 102, the pet attachment arm 104, and the pet accessory arm 106 may be constructed from a single strap or multiple straps connected together. In the present embodiment, the main strap 102 includes a sleeve 136. In the present embodiment, the arms 104,106 are straps. As will be described below, in the present embodiment, the main strap 102 includes a strip of elastic housed within the sleeve 136.

The main strap 102, pet attachment arm 104, and pet accessory arm 106 may be constructed from a variety of materials including, but not limited to, leather, nylon, chain, rope, cord, and various composite materials. As shown in FIG. 2, in various embodiments, the main strap 102 includes a stretchable material that creates bunching 204 in the sleeve 136 of the strap 102 in an unstretched condition. In various embodiments, the main strap 102 includes elastic within the sleeve 136. In various embodiments, the main strap 102 is constructed from nylon. In various other embodiments, the main strap 102 includes stretchable or extendable material that does not create bunching 204 in the sleeve 136. In various other embodiments, the main strap 102 is constructed from a non-stretchable material. In the current embodiment, the main strap 102 is constructed from a stretchable material and the arms 104,106 are constructed from non-stretchable material. In various other embodiments, any desired combination of stretchable and non-stretchable material may be used to construct the main strap 102, pet attachment arm 104, and pet accessory arm 106.

As shown in FIG. 1, in various embodiments, the main strap 102 includes a handle 120 proximate to the first end 108 for a user to grasp. The handle 120 may be integrally formed with the main strap 102 or attached to the main strap 102. In the current embodiment, the handle 120 is a loop formed by the main strap 102 proximate to the first end 108. The handle 120 defines a handle space 132 which a user may utilize to assist in grasping or holding the leash 100. In various other embodiments, the handle 120 is any suitable shape or mechanism for a user to grasp and hold the leash 100.

In various embodiments, the main strap 102 is connected to the pet attachment arm 104 and the pet accessory arm 106. In various embodiments, one or both of the pet attachment arm 104 and the pet accessory arm 106 are directly connected to the main strap 102 such that the arms 104,106 are either in contact with the main strap 102 at a connection point or attached through a connection mechanism such as a snap, clip, or hook that contacts both the main strap 102 and the arm 104 or 106. In various other embodiments, one of the arms 104,106 is indirectly connected to the main strap 102 such that the indirectly connected arm 104 or 106 attaches to another portion of the leash 100 and is thereby connected to the main strap 102. In various embodiments, the main strap 102 and one of the arms 104,106 are a single strap and the other arm 104,106 is connected at some part of the single strap. For example, in various embodiments, the main strap 102 and the pet accessory arm 106 are a single strap and the pet attachment arm 104 is connected at some point along the length of the single strap. In various other embodiments, the main strap 102 and the pet attachment arm 104 are a single strap and the pet accessory arm 106 is connected at some point along the length of the single strap. In various embodiments, at least one of the pet attachment arm 104 and the pet accessory arm 106 are connected to the main strap 102 at the second end 110; however, in various other embodiments, the at least one of the pet attachment arm 104 and the pet accessory arm 106 may connect to the main strap 102 at locations on the main strap 102 other than the second end 110. In various embodiments, the arms 104,106 may be connected to the main strap 102 at different locations on the main strap 102.

As shown in FIG. 1, in various embodiments, the second end 110 of the main strap 102 is connected to the first end 112 of the pet attachment arm 104 and the first end 116 of the pet accessory arm 106. In various embodiments where the main strap 102 includes the sleeve 136, the first ends 112,116 are inserted into sleeve 136 of the main strap 102 to connect to the main strap 102. In various embodiments, the main strap 102 may be fixably connected or detachably connected to the pet attachment arm 104 and pet accessory arm 106 with a connection mechanism 126. The arms 104,106 may be fixably connected in various embodiments, such as by sewing or gluing. The arms 104,106 are fixably connected where the arms 104,106 remain connected to the main strap 102 after an initial connection and the connection is not easily removable. The arms 104,106 may be detachably connected in various other embodiments, such as with a clip, hook, buckle, or hook and loop fasteners. The arms 104,106 are detachably connected where the arms 104,106 may be disconnected from the main strap 102 after the initial connection, the connection is easily removable, and may be reattached at a later time In the present embodiment, the connection mechanism 126 connecting the second end 110 of the main strap 102 to the first end 112 of the pet attachment arm 104 and the first end 116 of the pet accessory arm 106 is stitching; however, the disclosure of stitching should not be considered limiting on the current disclosure as the connection mechanism 126 may be various other connection mechanisms such as those in the group including, but not limited to, stitching, sewing, adhesive, glue, clasps, hooks, snaps, hooks and loops, buckles, male/female connection mechanisms, and various other connection mechanisms.

In various embodiments, the leash 100 is a retractable leash that includes a leash handle having a retracting member such as a rotating member mounted in a housing of the leash handle. The rotating member is connected to the leash 100 and automatically retracts the leash 100 into the housing by rotating, typically with a biasing member such as a flat coil spring. In various embodiments, the rotating member causes the leash 100 to retract as slack develops, preventing the leash 100 from dragging on the ground and extend as the user lets an animal attached to the leash 100 moves away from the user. In various embodiments, the retractable leash includes a stopper at a stop point along the leash 100 adapted to stop the leash from retracting or extending by contacting the housing or other portion of the leash handle. In various embodiments, the retracting member such as the rotating member is connected to the main strap 102 of the leash 100 and automatically retracts the main strap 102 of the leash 100. In various other embodiments, the rotating member may automatically retract the main strap 102 and one or both of arms 104,106 partially or fully into the housing.

As shown in FIG. 1, the pet attachment arm 104 includes an animal connector 122 attached at the second end 114 of the pet attachment arm 104. In the present embodiment, the animal connector 122 is a hook; however, the disclosure of the hook should not be considered limiting as in various other embodiments, the animal connector 122 is any connector suitable for connecting the pet attachment arm 104 to the animal restraint such as those in the group including, but not limited to, clasps, hooks, snaps, hooks and loops, buckles, male/female connection mechanisms, and various other connection mechanisms.

The pet accessory arm 106 includes an accessory connector 124 attached at the second end 118 of the pet accessory arm 106. In the present embodiment, the accessory connector 124 is a buckle; however, the disclosure of the buckle should not be considered limiting as in various other embodiments, accessory connector 124 is any connector suitable for connecting the pet accessory arm 106 to the connectable accessory may be utilized such as those in the group including, but not limited to, clasps, hooks, karabiner, snaps, hooks and loops, buckles, male/female connection mechanisms, and various other connection mechanisms. In the present embodiment, the accessory attached to the pet accessory arm 106 is a pet accessory such as a toy 128; however, the disclosure of the toy 128 should not be considered limiting as in various other embodiments, the pet accessory includes various toys, foods, treats, rawhide bones, training accessories, and various other accessories to be used by, with, or on the animal. As shown in FIG. 1, in various embodiments, the toy 128 or pet accessory includes a leash connector 130 complimentary to the accessory connector 124. In various embodiments, the leash connector 130 is connected to the connectable accessory through connection mechanisms including, but not limited to, tying, knots, clasps, hooks, karabiner, snaps, hooks and loops, buckles, male/female connection mechanisms, sewing, stitching, and various other connection mechanisms.

FIGS. 2 and 3 show the leash 100 without the toy 128 attached. As shown in FIGS. 2 and 3, in addition to the handle 120 at the first end 108, in various embodiments the main strap 102 also includes a first loop 200. In various embodiments, the first loop 200 is defined between the handle 120 and the first end 108 and provides another location on the leash 100 for the user to include an connection mechanism such as a karabiner, hook, buckle, or any other connection mechanism. In various embodiments, the user may attach the pet accessory to the connection mechanism on the first loop 200 or directly to the first loop 200 when the animal attached to the leash 100 is no longer using the pet accessory. In various embodiments, the leash 100 also includes a second loop 202 at the first end 108. In various embodiments, the second loop 202 is positioned between the first loop 200 and the first end 108; however, the location of the loops 200,202 should not be considered limiting on the current disclosure. In various embodiments, the second loop 202 provides another location on the leash 100 for the user to include a connection mechanism such as a karabiner, hook, buckle, or any other connection mechanism. In various embodiments with the second loop 202, the user may optionally attach the pet accessory to the first loop 200 or the second loop 202. In various embodiments, the user may also attach multiple pet accessories, such as whistles, toys, treats, or waste bag dispensers, to the leash such as a first pet accessory to the first loop 200 and a second pet accessory to the second loop 202. The number of pet accessories attachable to the leash 100 should not be considered limiting on the current disclosure.

FIGS. 2 and 3 also show the slider 134. In various embodiments, the slider 134 may be constructed from material in the group including, but not limited to, leather, nylon, chain, rope, and various composite materials. In various embodiments, the slider 134 defines a tubular shape with an outer surface 206 and an inner surface (not shown). In various embodiments, the inner surface defines a hollow center. When used with the leash 100, the main strap 102, pet attachment arm 104, and pet accessory arm 106 are movable through the hollow center of the slider 134 to movably position the slider 134 relative to the main strap 102 and arms 104,106. In various other embodiments, various other mechanisms besides the slider 134 may be utilized to connect the two arms 104,106 together such as those in the group including, but not limited to, clips, buttons, clasps, snaps, hook and loop connectors, and various other connecting mechanisms to connect the arms 104,106 together.

As shown in FIGS. 2 and 3, the slider 134 is positionable over both arms 104,106 of the leash 100. The slider 134 is also positionable over the main strap 102. In various embodiments, the slider 134 is slidable on the leash 100 from on the main strap 102 to on both of the arms 104,106 such that the slider 134 moves over the leash 100 with the leash passing through the slider 134. In various embodiments, the slider 134 is slidable on the leash 100 such that the slider 134 may be positioned at any location along the main strap 102, first arm 104, and second arm 106. In various embodiments, the slider 134 is slidable from on the main strap 102 at a position at least proximate or near to the second end 110 of the main strap 102 to at least proximate or near to the second end 118 of the pet accessory arm 106 when positioned on both of the arms 104,106.

In various embodiments the pet attachment arm 104 defines an outer surface 208 and an inner surface 210 and the pet accessory arm 106 defines an outer surface 212 and an inner surface 214. When the slider 134 is positioned on the arms 104,106 and proximate to the second end 118 of the pet accessory arm 106, the slider 134 holds the arms 104,106 together such that the inner surface 210 of the pet attachment arm 104 may face or even contact the inner surface 214 of the pet accessory arm 106. When the slider 134 is positioned over the main strap 102, the slider 134 does not hold the arms 104,106 together and the inner surfaces 210,214 may not face each other.

As shown in FIGS. 2 and 3, the main strap 102 has a length $L_1$ from the first end 108 to the second end 110, the pet attachment arm 104 has a length $L_1$ from the first end 112 to the second end 114, and the pet accessory arm 106 has a length $L_2$ from the first end 116 to the second end 118. In various embodiments, the pet accessory arm 106 is shorter than the pet attachment arm 104 and $L_1$ is greater than or equal to $L_2$. The length $L_2$ of the pet accessory arm 106 is shorter than the length $L_1$ of the pet attachment arm 104 in various embodiments such that when the toy 128 is in the mouth of a dog, tension in the leash 100 forms along the pet accessory arm 106.

FIG. 4 shows the back of the leash 100. FIG. 5 shows the front of the leash 100. As shown in FIG. 5, because the pet accessory arm 106 is shorter than the pet attachment arm 104, a portion of the inner surface 210 of the pet attachment arm 104 remains uncovered by the pet accessory arm 106 when the pet accessory arm 106 is positioned over the pet attachment arm 104. When positioned over and around the arms 104,106, the inner surface of the slider 134 faces the outer surface 208 of the pet attachment arm 104 and the outer surface 212 of the pet accessory arm 106.

FIG. 6 shows a top view of the leash 100 and FIG. 7 shows a bottom view of the leash 100. As shown in FIGS. 6 and 7, in various embodiments, the width W of the loop formed by the handle 120 defines the widest width of the leash 100.

FIG. 8 shows the slider 134 positioned over the main strap 102. The slider 134 is positioned proximate to the second end 110 of the main strap 102 such that at least a portion of the main strap 102 extends beyond a first end 300 and beyond a second end 302 of the slider 134. In various embodiments, when the slider 134 is positioned proximate the second end 110 on the main strap 102, the slider 134 is positioned over the connection mechanism 126. The slider 134 positioned on the main strap 102 defines an unrestricting position. In this unrestricting position, the slider 134 is not positioned over the arms 104,106 and the arms 104,106 are independently movable from the second ends 114,118 to the connection mechanism 126 relative to the main strap 102. The arms 104,106 are independently movable in the unrestricting position such that the pet attachment arm 104 is movable relative to the main strap 102 without affecting movement of the pet accessory arm 106 relative to the main strap 102. Similarly, in the unrestricting position, the pet accessory arm 106 is movable relative to the main strap 102 without affecting movement of the pet attachment arm 104 relative to the main strap 102

FIG. 9 shows the slider 134 positioned over the arms 104,106 proximate to the second end 118 of the pet accessory arm 106. In various embodiments, positioning the slider 134 over the arms 104,106 and proximate to the second end 118 and distal from the main strap 102 defines a restricting position. In the restricting position, as shown in FIG. 9, at least a portion of the pet attachment arm 104 extends beyond the ends 300,302 of the slider 134 and at least a portion of the pet accessory arm 106 extends beyond the ends 300,302 of the slider 134. In the restricting position, the arms 104,106 are jointly movable relative to the main strap 102. In the restricting position, the pet attachment arm 104 is held against the pet accessory arm 106. In various embodiments, in the restricting position, movement of the pet attachment arm 104 relative to the main strap 102 causes similar movement of the pet accessory arm 106 relative to the main strap 102 or vice versa. In various other embodiments, the slider 134 may cover the second end 118 or be positioned at the second end 118. In various embodiments, the accessory connector 124 also serves as a slide stop and prevents the slider 134 from being moved completely over the second end 118.

As will be described below, in various embodiments the user may position the slider 134 in the unrestricting position shown in FIG. 8 when the toy 128 is connected and being used by the animal. The user may position the slider 134 in the restricting position shown in FIG. 9 when the toy 128 is disconnected or not being used by the animal to prevent the pet accessory arm 106 from unrestricting movement when not in use.

FIG. 10 shows the connection mechanism 126 securing the pet accessory arm 106 after the pet accessory arm 106 is inserted into the hollow center of the strap 102. The slider 134 shown in FIG. 10 is positioned at an intermediary position on the arms 104,106 between the restricting position shown in FIG. 9 and the unrestricting position shown in FIG. 8. The slider 134 may also be placed into an intermediary position anywhere between the restricting position shown in FIG. 9 and the unrestricting position shown in FIG. 8 to effectively increase or decrease lengths $L_1$ and $L_2$ to desired lengths.

FIG. 11 shows the pet attachment arm 104 with length $L_1$ and the pet accessory arm 106 with length $L_2$. As previously described, the pet attachment arm 104 connects to an animal such as a dog through the animal connector 122 and the pet accessory arm 106 connects to a pet accessory such as the toy 128. In typical leashes without the pet accessory arm 106, a user controls the animal by pulling on the handle 120 of the main strap 102 and thereby the pet attachment arm 104. In the current embodiment with both the pet attachment arm 104 and the pet accessory arm 106, the user controls the animal through both the pet attachment arm 104 and the pet accessory arm 106. In various embodiments, $L_2$ is less than $L_1$ such that when the toy 128 is connected to the accessory connector 124, the animal is connected to the animal connector 122 and the animal is holding the toy 128. In various embodiments, when the animal holds the toy 128, such as when a dog holds the toy 128 in the dog's mouth, both the pet attachment arm 104 and the pet accessory arm 106 will remain relatively taut as the user holds the handle 120. In various other embodiments where $L_2$ is less than $L_1$, when the dog holds the toy 128 in the dog's mouth, the pet accessory arm 106 is taut and the pet attachment arm 104 is slackened as the user holds the handle 120. The slider 134 is positioned on the arms 104,106 in any position but the restricting position such that the leash 100 connects to the animal and allows the animal to grab the pet accessory connected to the leash 100. In this manner, the user holding the handle 120 may pull on the handle 120 and main strap 102, thereby pulling on both the pet attachment arm 104 and pet accessory arm 106 and controlling the animal through both arms 104,106.

When the animal is no longer utilizing the pet accessory or the pet accessory is otherwise disconnected from the accessory connector 124, the user may slide the slider 134 to the restricting position such that the pet accessory arm 106 does not move freely relative to the pet attachment arm 104. In these embodiments where the accessory is disconnected, the user controls the animal by pulling on the main strap 102 and thereby pulling on the pet attachment arm 104 connected to the animal.

Figure 12:
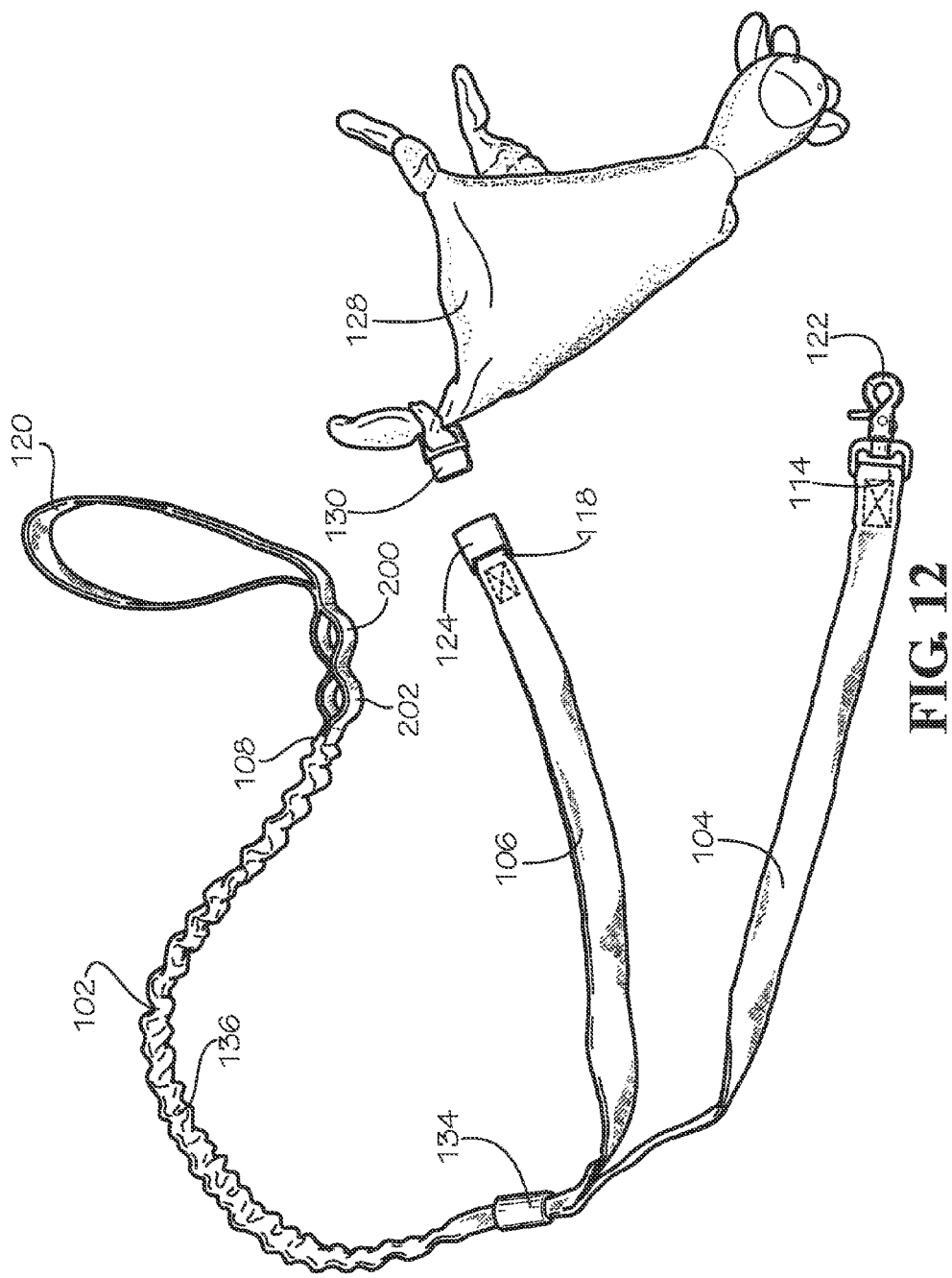
FIG. 12 is another perspective view of the leash of FIG. 1 with the pet accessory unattached.

Referring now to FIG. 12, a method of assembling the leash 100 is disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The leash 100 having the main strap 102 with the first end 108 and second end 110 is initially provided.

A handle 120 is part of the leash 100 in various embodiments proximate to the first end 108. In various embodiments the handle 120 is integrally formed with the main strap 102 or connected or attached to the main strap 102. In various embodiments, a first loop 200 is formed between the handle 120 and the first end 108. In various other embodiments, a second loop 202 is also formed between the handle 120 and the first end 108.

The method includes positioning a slider 134 over the first end 108 of the main strap 102 and connecting the first end 112 of a pet attachment arm 104 and the first end 116 of a pet accessory arm 106 with the main strap 102 at the second end 110. In various embodiments, connecting the arms 104,106 to the main strap 102 includes positioning the first ends 112,116 within the sleeve 136 of the main strap 102. After the arms 104,106 are connected to the main strap 102, the slider 134 is slidable on the main strap 102 and the arms 104,106. An animal connector 122 connected to the second end 114 of the pet attachment arm 104 is connected to an animal to be controlled. An accessory connector 124 connected to the second end 118 of the pet accessory arm 106 is connected to a pet accessory such as a toy 128. In various embodiments, the pet attachment arm 104 and the accessory connector 124 are detachable from the animal and pet accessory, respectively. In various embodiments, the accessory connector 124 mates with a complimentary leash connector 130 to connect the pet accessory to the leash 100.

Figure 13:
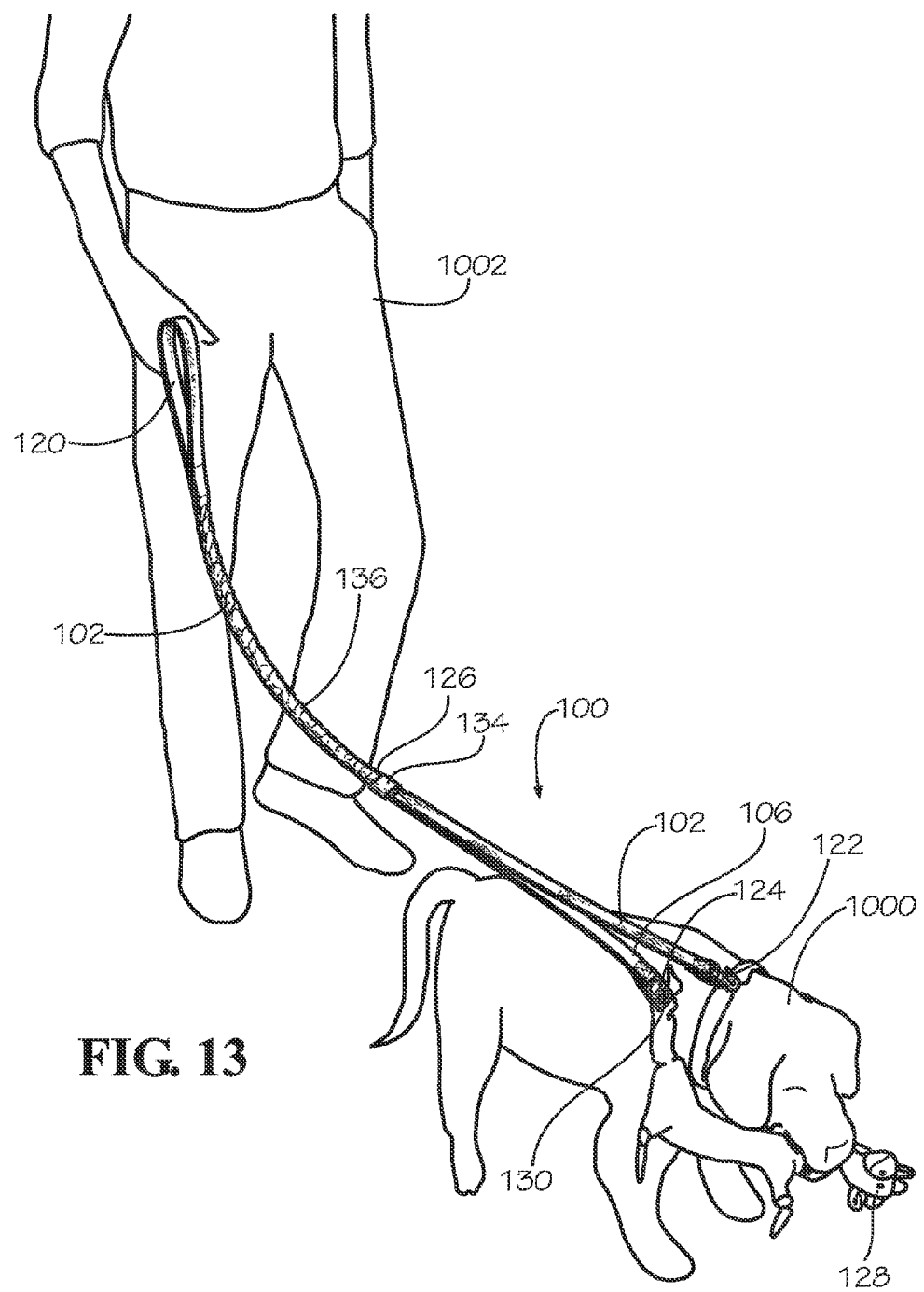
FIG. 13 is a perspective view of the leash of FIG. 1 being utilized by a user with an animal.

Referring now to FIG. 13, a method of using the leash 100 is disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The leash 100 having the main strap 102, the pet attachment arm 104, and the pet accessory arm 106 is provided. A user 1002 may hold the main strap 102, the pet attachment arm 104 connects to an animal restraint such as a collar or harness, and the pet accessory arm 106 is connected to a connectable accessory, such as a pet toy 128. In various embodiments the leash 100 includes a slider 134 slidable on the main strap 102, the pet attachment arm 104, and the pet accessory arm 106. In various embodiments, the main strap 102 includes a sleeve 136. In various embodiments, the leash 100 includes an elastic material or elastic portion housed within the sleeve 136. In various embodiments, the pet attachment arm 104 and the pet accessory arm 106 are straps. The length $L_1$ of the pet attachment arm 104 is greater than the length $L_2$ of the pet accessory arm 106 in various embodiments.

The method includes connecting the pet attachment arm 104 to an animal 1000 through the animal connector 122 and the pet accessory arm 106 to a pet accessory such as a toy 128 through the accessory connector 124. As shown in FIG. 13, in various embodiments, the user 1002 holds the handle 120 connected to the main strap 102. In various embodiments, the handle 120 is connected to the main strap 102; however, in various other embodiments, the handle 120 and main strap 102 are the same single material. The animal 1000 is connected to the leash 100 through the animal connector 122 and by grabbing the toy 128. In various embodiments, when the animal 1000 grabs the toy 128, the pet accessory arm 106 is taut and the pet attachment arm 104 is slackened. The user 1002 controls the animal 1000 by pulling on the handle 120 and main strap 102, thereby pulling on both the pet attachment arm 104 and the pet accessory arm 106. In various embodiments, because the pet accessory arm 106 is taut and the pet attachment arm 104 is slackened, pulling on the handle 120 pulls on the animal 1000 through the pet accessory arm 106 such that there is slack in the pet attachment arm 104. In this manner, the user 1002 uses both arms 104, 106 to control and direct the animal 1000 holding the toy 128. In various embodiments, pulling on the handle 120 pulls on the toy 128 before it pulls on the animal 1000 because the length $L_1$ of the pet accessory arm 106 is less than the length $L_2$ of the pet attachment arm 104.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A leash comprising:
a main strap, the main strap being non-rigid;
a pet attachment arm connected to the main strap, the pet attachment arm being non-rigid, the pet attachment arm including an animal connection mechanism; and
a pet accessory arm connected to the main strap, the pet accessory arm being non-rigid, the pet accessory arm including an accessory connection mechanism, the pet accessory arm comprising a pet toy connected to the pet accessory arm; and
wherein the main strap comprises an elastic portion.

2. The leash of claim 1, wherein the animal connection mechanism includes an animal connector for detachably connecting an animal to the leash.

3. The leash of claim 1, wherein the accessory connection mechanism includes an accessory connector for detachably connecting a pet accessory to the leash.

4. The leash of claim 1, wherein the pet attachment arm and the pet accessory arm are directly connected to the main strap.

5. The leash of claim 1, further comprising:
a handle connected to a first end of the main strap; and
a first loop positioned between the first end of the main strap and the handle, wherein the main strap, handle, and first loop are formed from a single material.

6. The leash of claim 1, further comprising a slider positioned on at least one of the main strap, the pet attachment arm, and the pet accessory arm, the slider slidable over at least a portion of the leash.

7. The leash of claim 6, wherein the slider is slidable to an unrestricting position on the main strap, and wherein the pet attachment arm and the pet accessory arm are independently movable relative to the main strap in the unrestricting position.

8. The leash of claim 6, wherein the slider is slidable to a restricting position on the pet attachment arm and the pet accessory arm at least proximate to an end of the pet accessory arm distal from the main strap, and wherein the pet accessory arm is held against the pet attachment arm in the restricting position.

9. The leash of claim 1, wherein the pet attachment arm has a pet attachment arm length and the pet accessory arm has a pet accessory arm length, and wherein the pet attachment arm length is greater than or equal to the pet accessory arm length.

10. The leash of claim 1, wherein the pet toy is configured to be held in a pet's mouth.

11. A leash comprising:
a main strap;
a handle connected to a first end of the main strap;
a first loop positioned between the first end of the main strap and the handle, wherein the main strap, handle, and first loop are formed from a single material;
a pet attachment arm directly connected to the main strap, the pet attachment arm including an animal connection mechanism; and
a pet accessory arm directly connected to the main strap, the pet accessory arm including an accessory connection mechanism;
wherein at least a one of the pet attachment arm and the pet accessory arm is inserted into a hollow center defined by the main strap.

12. The leash of claim 11, wherein the pet attachment arm and the pet accessory arm are each held in direct contact with the main strap by a connection mechanism.

13. The leash of claim 12, wherein the connection mechanism is stitching.

14. The leash of claim 11, wherein the main strap, the pet attachment arm, and the pet accessory arm are each non-rigid.

15. The leash of claim 11, wherein the pet accessory arm comprises a pet accessory configured to be held in a pet's mouth, and wherein the pet accessory arm is configured to pull on the pet accessory and thereby the pet's mouth when the main strap is pulled by a user.

* * * * *